Feb. 21, 1928. 1,660,024
A. ABRAMS
APPARATUS FOR TESTING PERMEABILITY OF MATERIALS
Filed May 4, 1927
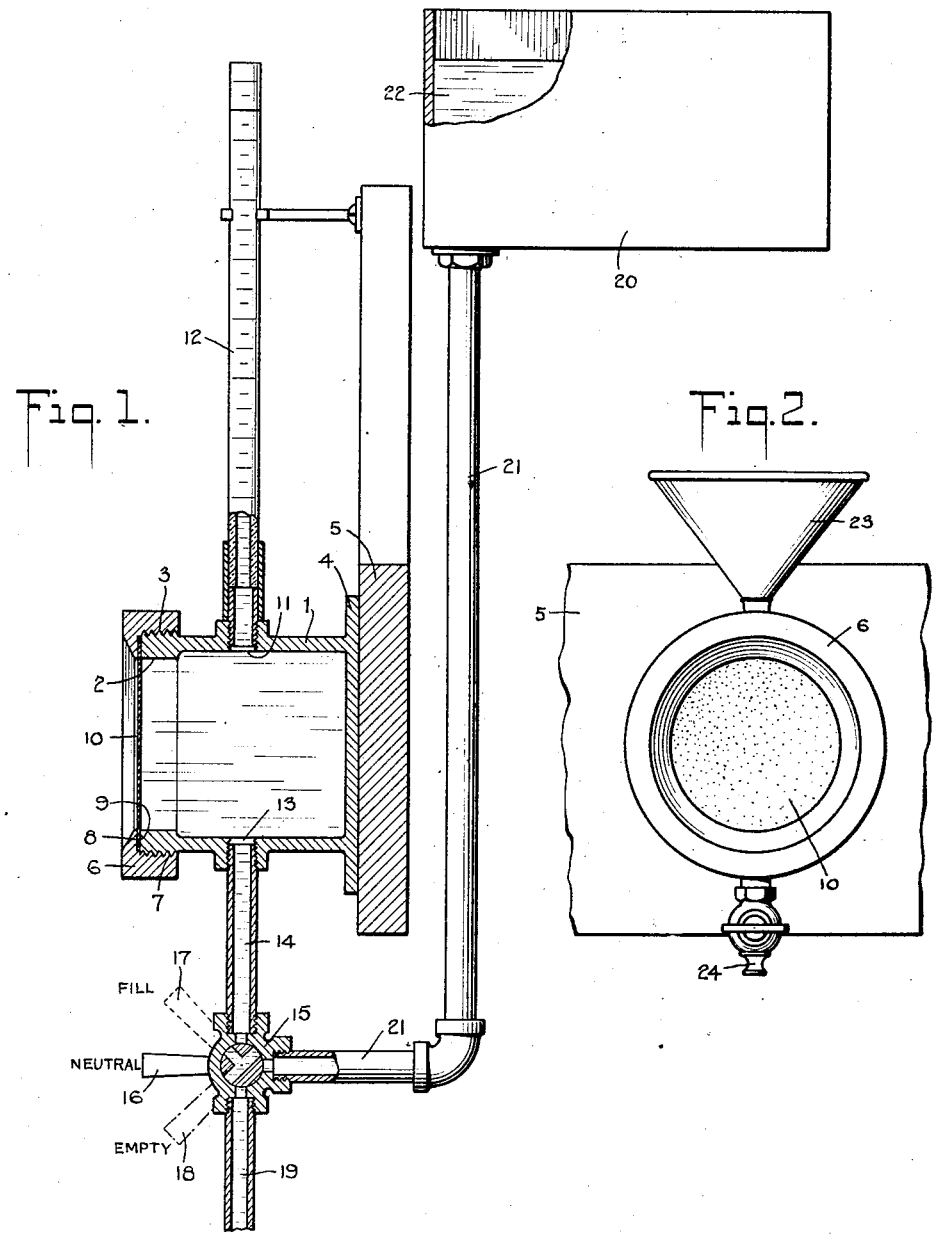
Allen Abrams
INVENTOR
BY *[signature]*
ATTORNEY Patented Feb. 21, 1928.

1,660,024

UNITED STATES PATENT OFFICE.

ALLEN ABRAMS, OF ROTHSCHILD, WISCONSIN.

APPARATUS FOR TESTING PERMEABILITY OF MATERIALS.

Application filed May 4, 1927. Serial No. 188,817.

This invention relates to the testing of materials, more particularly to the testing of fibrous sheet materials, such as paper, fabric and the like for the resistance thereof to penetration by liquids.

For a number of uses it is of considerable importance that the quality of the material, such as paper, be known in order to determine the best conditions under which the material should be used. For example, it is of considerable importance where such material is to be used for battery board, test liner and the like, to obtain characteristics thereof as to complete water penetration.

For wall boards it is essential to note partial water penetration thereof. For moisture proof packages the loss of moisture by evaporation is of considerable importance. In a similar manner other properties of paper are of importance in determining adaptability thereof for various uses, such as the penetrability of greaseproof paper and the permeability by special liquids such as waxes, varnishes, lactic acid and the like.

Considerable work has been done to provide a suitable means for testing paper and the like, for determining the sizing characteristics thereof. The dry indicator method appears to give consistent and dependable results in the determination of characteristics of paper and the resistance thereof to water. The principle of this method has been described by other investigators.

The present invention is directed to an apparatus for testing the permeability of such materials, and also to methods for making the determinations, said methods including the dry indicator method.

In the accompanying drawing constituting a part hereof and in which like reference characters indicate like parts, Figure 1 is a side elevational view of one form of apparatus adapted for the practicing of my invention, some of the parts being shown in section for clearness, and Figure 2 is a front elevational view of a simplified and modified form of the invention.

I provide a cylindrical container 1 placed in such a position that its axis is horizontal and having an opening 2 at one face thereof, provided with a threaded exterior portion 3, in proximity to the opening. The opposite end of the cylinder 1 is closed by a member 4 which is secured to a backing or support 5 by any suitable means, such as screws, not shown. A member 6 having a threaded portion 7 is adapted to be threaded on to the cylindrical container 1, so that a flat face 8 thereof may make substantial contact with a similar flat face 9 on the container 1. Between the flat faces 8 and 9 is placed a sheet 10 of suitable material to be tested, such as paper, and if said sheet is thin there is generally inserted a rubber washer between the said faces to more securely hold the sheet in position.

In the top or one side of the cylindrical container 1 is a threaded opening 11 into which is secured a tube 12, which is generally of glass and is provided with graduations. In the bottom or opposite side of cylindrical container 1 is a threaded opening 13 having a pipe 14 fitted into the same and a three-way valve 15 communicating therewith. As shown in Figure 1, the handle 16 of the valve 15 is in the neutral position. When it is placed in position 17 liquid 22 is allowed to flow from tank 20 through pipe 21 into pipe 14, thus into the container 1. When the handle is placed in the position 18, liquid flows from the container 1, pipe 14 and out through the waste pipe 19.

In Figure 2 is shown a somewhat modified form of apparatus which, however, is constructed essentially as the apparatus of Figure 1 with the exception that in place of graduated tube 12 there is inserted a funnel 23. In place of pipe 14 and its associated parts there is substituted a simple drain cock 24.

The apparatus may be operated in a number of ways for the testing of paper as follows:

A sheet of paper or the like 10 is clamped between the faces 8 and 9 by threaded member 6 on to cylindrical container 1, as shown in Figure 2. Liquid such as water is poured into the funnel 23 so as to fill the container 1. The time elapsing from the first addition of water until it has penetrated to the outside of the sheet 10 is noted, and is a test of the complete water penetration of the material. The drain cock 24 is then opened allowing the water to flow from the container. The member 6 is unscrewed, the sheet 10 removed and a fresh sheet inserted for another test.

To determine the partial water penetration the apparatus shown in Figure 1 is preferably used. The material, such as wall board to be tested, is inserted between the container 1 and member 6 as before. Valve 15 is manipulated so that handle 16 is in position 17 allowing water to flow from tank 20 into container 1 and substantially filling tube 12 after which the handle 16 is placed in neutral position. Readings are then taken at different intervals of time showing the drop in the level of liquid in the tube 12, which is an indication of the penetration of water through the sample. The handle 16 is then placed in position 18 allowing the water remaining in the apparatus to drain therefrom. The sample 10 is removed from the apparatus and a new sample placed therein. From the data thus obtained a curve is drawn wherein the intervals of time are plotted against amounts of liquid passing through said material.

The apparatus is adapted for making various other tests, for example, test for evaporation loss through sheets of paper, which may be performed by placing the sample 10 in the apparatus as before, but also placing a wire netting, not shown, on the outside of the sample. The tester is then filled with water up to a known level of the tube 12 and the drop in level of liquid in the said tube is noted at regular intervals, say one hour, for a suitable length of time, to determine the rate of evaporation from the outside surface of the sample 10.

This apparatus is well adapted to the practice of the dry indicator method for sizing which may be performed as follows:

There is provided a circular glass plate, not shown, adapted to fit between surfaces 8 and 9 and having one of its faces ground, and a mixture containing pulverized sugar and a readily soluble dye, such as methyl violet, safranin, auramine and the like, is spread in a thin layer evenly over the ground glass surface. A sample of paper is placed on the said surface and a rubber ring to hold the sample in place. The assembly is then placed as usual on the open end of container 1 with the smooth glass surface on the outside. The container 1 is then filled with water and the time until dye begins to develop color is noted and constitutes a measure of the internal sizing of the material.

Greaseproofing may be determined by using as a liquid, in place of water, a suitable amount of turpentine and noting the time elapsing from the start of filling the container 1 of Figure 2 until the first appearance of spots on the outer surfaces of the paper.

The permeability of the samples by alcohol, lactic acid and other liquids may be determined in similar manner.

Although I have described my invention giving two forms of apparatus which may be used, it is apparent that my invention is not limited to the exact forms described and illustrated, but that various changes in the apparatus may be made within the scope of the invention. Other methods than those described are capable of being carried out by this apparatus and the methods which I have described may, of course, be practiced with variations and still give excellent results. I contemplate various changes in the details of the invention, the scope of which is limited only by the claims appended hereto.

What I claim is:

1. An apparatus for testing the permeability of materials comprising a single container for liquid having a lateral opening surrounded by a vertical clamping face, means for allowing liquid to flow into the same, means for allowing liquid to flow out of the same, and an annular member having walls adapted to register with the walls of the opening and means for securing said member to the container and thereby adapting the same to hold material to be tested.

2. An apparatus for testing the permeability of materials comprising a container for liquid having an opening in an exposed face thereof, a member fitting onto said container at said opening and means for securing said member to the container and thereby adapting the same to hold material to be tested, means at one side for allowing liquid to flow into said container and means at the opposite side for allowing liquid to flow out of the same.

3. An apparatus for testing the permeability of materials comprising a container for liquid having an opening in an exposed face thereof, a member fitting onto said container at said opening and means for securing said member to the container and thereby adapting the same to hold material to be tested, a graduated tube extending from the upper portion of said container and a tube controlled by a valve at the lower portion thereof.

4. An apparatus for testing the permeability of materials comprising a container for liquid having an opening in an exposed face thereof, a member fitting onto said container at said opening and means for securing said member to the container and thereby adapting the same to hold material to be tested, a graduated tube extending from the upper portion of said container and a tube controlled by a 3-way valve at the lower portion thereof.

5. An apparatus for testing the permeability of materials comprising a container for liquid having an opening in an exposed face thereof, a member fitting onto said container at said opening and means for securing said member to the container and thereby adapting the same to hold material to be tested, a graduated tube extending from the upper portion of said container, a tube controlled by a valve at the lower portion thereof and a source of liquid connected to said latter tube.

6. An apparatus for testing the permeability of materials comprising a cylindrical container for liquid having a cylindrical opening in an exposed face thereof, means for securing the same to a suitable support, a cylindrical member threaded onto said container at said opening and means for securing said member to the container and thereby adapting the same to hold material to be tested in a vertical position, a graduated tube threaded into an opening in the upper portion of said container, a tube provided with a 3-way valve threaded into the lower portion of the same, and a source of liquid connected to said valve.

7. An apparatus for testing the permeability of materials comprising a container for liquid, means for securing the same to a base, connections thereto for the entrance and exit of liquids and for maintaining a head of liquid, an opening in an exposed lateral face of said container, and means for releasably clamping material to be tested to said opening, said clamping means being operable without disturbing said connections or container.

In testimony whereof, I have hereunto subscribed my name this 30th day of April, 1927.

ALLEN ABRAMS.